(12) United States Patent
Huang (10) Patent No.: US 10,966,176 B2
(45) Date of Patent: Mar. 30, 2021

(54) PAGING METHOD, RAN-UP ENTITY, RAN-CP ENTITY AND UE

(71) Applicant: ZTE CORPORATION, Guanghong (CN)

(72) Inventor: Qiang Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 147 days.

(21) Appl. No.: 16/232,972

(22) Filed: Dec. 26, 2018

(65) Prior Publication Data

US 2019/0246372 A1 Aug. 8, 2019

Related U.S. Application Data

(63) Continuation of application No. PCT/CN2017/089367, filed on Jun. 21, 2017.

(30) Foreign Application Priority Data

Jun. 28, 2016 (CN) .......................... 201610485952.6

(51) Int. Cl.
*H04W 68/00* (2009.01)
*H04W 76/25* (2018.01)
(Continued)

(52) U.S. Cl.
CPC ........... *H04W 68/005* (2013.01); *H04L 12/28* (2013.01); *H04W 8/12* (2013.01); *H04W 76/11* (2018.02);
(Continued)

(58) Field of Classification Search
None
See application file for complete search history.

(56) References Cited

U.S. PATENT DOCUMENTS 8,467,681 B2 6/2013 Lee et al.

FOREIGN PATENT DOCUMENTS

| CN | 101115292 A | 1/2008 |
| CN | 101242645 A | 8/2008 |

(Continued)

OTHER PUBLICATIONS

3GPP TS 23.882 V1.3.0 (Jul. 2006); 3rd Generation Partnership Project; Technical Specification Group Services and System Aspects; 3GPP System Architecture Evolution: Report on Technical Options and Conclusions (Release 7) (Year: 2006).*

(Continued)

*Primary Examiner* — Joseph A Bednash
(74) *Attorney, Agent, or Firm* — Perkins Coie LLP (57) ABSTRACT

Provided are a paging method, a residential access network user plane (RAN-UP) entity, a residential access network control plane (RAN-CP) entity and a user equipment (UE). The method includes that the RAN-UP entity receives a data packet transmitted from a core network and transmits to the RAN-CP entity. The RAN-CP entity encapsulates the data packet in a paging message and transmits the paging message to UE. The paging message carries a first indication message for indicating the UE to maintain in an inactive state when receiving the paging message, and extract the data packet from the paging message. In another aspect, the RAN-UP entity receives the data packet transmitted from the core network and transmits a data packet arrival indication or a paging indication to the RAN-CP entity. The RAN-CP entity encapsulates the paging message and transmits the paging message to the UE. The paging message carries a second indication message for indicating the UR to emigrate from the inactive state and enter into an active state, and receive the data packet transmitted by the RAN-UP entity when receiving the paging message.

14 Claims, 10 Drawing Sheets

(51) Int. Cl.
*H04W 76/11* (2018.01)
*H04W 8/12* (2009.01)
*H04L 12/28* (2006.01)
*H04W 88/02* (2009.01)

(52) U.S. Cl.
CPC ......... *H04W 76/25* (2018.02); *H04W 88/023* (2013.01); *Y02D 30/70* (2020.08)

(56) References Cited

FOREIGN PATENT DOCUMENTS

| CN | 103945535 A | 7/2014 |
|---|---|---|
| WO | 2008 082352 A | 7/2008 |

OTHER PUBLICATIONS

CMCC, "Consideration of UE states"; 3GPP TSG RAN WG2 Meeting #94, Nanjing, China, May 23-27, 2016, R2-163449 (Year: 2016).*

Huawei et al. "On RAN initiated paging", 3GPP TSG-RAN WG2Meeting #94, Nanjing, China, May 23-27, 2016, R2-163932 (Year: 2016).*

Nokia et al., "Paging for Light Connection", 3GPP TSG RAB WG3 Meeting #92, Nanjing, China, May 23-27, 2016, R3-161352 (Year: 2016).*

3GPP, Ericsson, "Next Generation RAT Functionalities," 3GPP TSG-RAN WG3 Meeting #91bis, Bengalore, India, R3-160844, 4 pages, Apr. 2016.

3GPP, MediaTek Inc., "NB-IOT—Remaining Issues on Idle-mode Procedures and Paging," 3GPP TSG RAN WG2 Meeting #93bis, Dubrovnik, Croatia, R2-162882, 13 pages, Apr. 2016.

Chinese Office Action dated Feb. 18, 2020 for Chinese Patent Application No. 201610485952.6, filed on Jun. 28, 2016 (8 pages).

Chinese Office Action dated May 8, 2020 for Chinese Patent Application No. 201610485952.6, filed on Jun. 28, 2016 (15 pages).

Chinese Office Action dated Nov. 28, 2019 for Chinese Patent Application No. 201610485952.6, filed on Jun. 28, 2016 (21 pages).

Extended Search Report dated Oct. 28, 2019 for European Application No. 17819148.2, filed on Jun. 21, 2017 (11 pages).

International Search Report and Written Opinion dated Jul. 27, 2017 for International Application No. PCT/CN2017/089367, filed on Jun. 21, 2017 (16 pages).

* cited by examiner

PAGING METHOD, RAN-UP ENTITY, RAN-CP ENTITY AND UE

CROSS REFERENCE TO RELATED APPLICATIONS

This patent document is a continuation of and claims priority to International Patent Application No. PCT/CN2017/089367, filed on Jun. 21, 2017, which claims the benefit of priority of Chinese Patent Application No. 201610485952.6, filed on Jun. 28, 2016. The entire contents of the before-mentioned patent applications are incorporated by reference as part of the disclosure of this application.

TECHNICAL FIELD

The present application relates to, but is not limited to, wireless communication technologies and, in particular, relates to a paging method, a residential access network user plane (RAN-UP) entity, a residential access network control plane (RAN-CP) entity and a user equipment (UE).

BACKGROUND

Although the cellular mobile communication technology has entered a 4-th generation (4G) era, in order to meet higher, faster and newer communication requirements in the future, the industry has begun to carry out researches on 5-th generation (5G) technology. The 5G technology aims at conducting further researches on a greater throughput, more user connections, a lower latency, a higher reliability and lower power consumption. At present, the goals of the 5G technology proposed by industry are: achieving a 1000 times growth of mobile data traffic per region, a 10 to 100 times growth of throughput per user equipment (UE), a 10 to 100 times growth of the number of connected devices, and a 10 times extension of the battery life for low-power devices and a 5 times reduction of the end-to-end delay by 2020.

Compared with 4G, higher performance requirements are proposed in 5G researches, one of which is a requirement that control plane state transition (f from a state of being unable to transmit data to a state of being able to transmit data) should be within 10 ms, and on this basis, the UE may save electricity as much as possible. Therefore, a new UE state is required that is—an inactive state. In the inactive state, the UE and the network side do not have dedicated active state resources, and a UE-level bearer connection is maintained between the network side and the core network. Due to the diversity of 5G terminals, this inactive state may be applied to various terminals and services such as a mobile phone and an Internet of Things (IoT) device. A priority class of these services and characteristics of data packets will propose new requirements for the inactive state. Meanwhile, with the trend of a residential access network (RAN) software defined network (SDN), a RAN control plane and a RAN user plane also tend to a separation architecture, in this case, an anchor point of the RAN control plane may be separated from an anchor point of the RAN user plane, thereby implementing a flexible deployment architecture of the SDN.

SUMMARY

The following is a summary of the subject matter described herein in detail. This summary is not intended to limit the scope of the claims.

Embodiments of the present disclosure provide a paging method, a residential access network user plane (RAN-UP) entity, a residential access network control plane (RAN-CP) entity and a user equipment (UE).

A paging method provided by an embodiment of the present disclosure is applied in a residential access network user plane (RAN-UP) entity. The method includes that:

the RAN-UP entity receives a data packet transmitted from a core network;

the RAN-UP entity transmits the data packet or a control message to a residential access network control plane (RAN-CP) entity.

In the embodiment of the present disclosure, the step in which the RAN-UP entity receives the data packet transmitted from the core network includes that:

the RAN-UP entity receives the data packet transmitted from the core network through a first interface.

In the embodiment of the present disclosure, the first interface is a S1 interface or a S1-U interface.

In the embodiment of the present disclosure, the step in which the RAN-UP entity transmits the data packet or the control message to the RAN-CP entity includes that:

the RAN-UP entity transmits the data packet or the control message to the RAN-CP entity through a second interface. The control message is a data arrival indication or a paging indication.

In the embodiment of the present disclosure, the second interface is an Xn interface, and n is an integer.

In the embodiment of the present disclosure, the method further includes that:

when transmitting the data packet to the RAN-CP entity through the second interface by the RAN-UP entity, carrying service identification information in an interface message corresponding to the second interface; or packs and encodes the data packet and the service identification information into a data stream and transmits the data stream to the RAN-CP entity. The service identification information is at least one of: a logical channel identifier of a service where the data packet is located and a bearer identifier to which the service belongs.

A paging method provided by another embodiment of the present disclosure is applied in a residential access network control plane (RAN-CP) entity. The method includes that:

the RAN-CP entity receives a data packet transmitted from a residential access network user plane (RAN-UP) entity, and encapsulates the data packet in a paging message and transmits the paging message to a UE; where a first indication message is carried in the paging message, the first indication message is configured for indicating the UE to maintain an inactive state when receiving the paging message, and extract the data packet from the paging message; or the RAN-CP entity receives a control message transmitted from the RAN-UP entity, the RAN-CP entity encapsulates the paging message and transmits the paging message to the UE; where a second indication message is carried in the paging message, the second indication message is configured for indicating the UE to emigrate from the inactive state and enter into an active state when receiving the paging message, and receive the data packet transmitted from the RAN-CP entity.

In the embodiment of the present disclosure, the step in which the RAN-CP entity receives the data packet or the control message transmitted from the RAN-UP entity includes that:

the RAN-CP entity receives the data packet or the control message transmitted from the RAN-UP entity through a second interface. The control message is a data arrival indication or a paging indication.

In the embodiment of the present disclosure, the second interface is an Xn interface, and n is an integer.

In the embodiment of the present disclosure, the method further includes that:

the RAN-CP entity extracts service identification information from an interface message corresponding to the second interface when the RAN-CP entity receives the data packet transmitted from the RAN-UP entity through the second interface; and encapsulates the service identification information in the paging message and transmits the paging message to the UE; or integrates the service identification information in an encoding form into the data packet, and encapsulates the data packet in the paging message and transmits the paging message to the UE; or encapsulates the data packet and a data stream of the service identification information which are encoded and transmitted by the RAN-UP entity in the paging message and transmits the paging message to the UE. The service identification information is at least one of: a logical channel identifier of a service where the data packet is located and a bearer identifier to which the service belongs.

Another embodiment of the present disclosure provides a paging method, which is applied in a UE. The method includes that:

when the UE is in an inactive state, the UE receives a paging message transmitted from a residential access network control plane (RAN-CP) entity;

extracts a first indication message from the paging message; and maintains in the inactive state and extracts a data packet from the paging message in the inactive state according to the first indication message.

A paging method provided by another embodiment of the present disclosure is applied in UE. The method includes that:

when the UE is in an inactive state, the UE receives a paging message transmitted from a residential access network control plane (RAN-CP) entity;

extracts a second indication message from the paging message; and emigrates from the inactive state and enters into an active state, and receives a data packet transmitted from a residential access network user plane (RAN-UP) entity in the active state according to the second indication message.

A residential access network user plane (RAN-UP) entity provided by an embodiment of the present disclosure includes:

a first receiving unit, which is configured to receive a data packet transmitted from a core network;

a first transmitting unit, which is configured to transmit the data packet or a control message to a residential access network control plane (RAN-CP) entity.

In the embodiment of the present disclosure, the first receiving unit is configured to receive the data packet transmitted from the core network through a first interface.

In the embodiment of the present disclosure, the first transmitting unit is configured to transmit the data packet or the control message to the RAN-CP entity through a second interface, and the control message is a data arrival indication or a paging indication.

In the embodiment of the present disclosure, the RAN-UP entity further includes: a first processing unit, which is configured to carry service identification information in an interface message corresponding to the second interface when transmitting the data packet to the RAN-CP entity through the second interface; or encode the service identification information into a data stream and transmit the data stream to the RAN-CP entity. The service identification information is at least one of: a logical channel identifier of a service where the data packet is located and a bearer identifier to which the service belongs.

A residential access network control plane (RAN-CP) entity provided by an embodiment of the present disclosure includes:

a second receiving unit, which is configured to receive a data packet or a control message transmitted from a residential access network user plane (RAN-UP) entity;

a second transmitting unit, which is configured to encapsulate the data packet in a paging message and transmit the paging message to the UE; where a first indication message is carried in the paging message, the first indication message is configured for indicating the UE to maintain in an inactive state when receiving the paging message, and extract the data packet from the paging message; or is configured to encapsulate the paging message and transmit the paging message to the UE; where a second indication message is carried in the paging message, the second indication message is configured for indicating the UE to emigrate from the inactive state and enter into an active state when receiving the paging message, and receive the data packet transmitted from the RAN-CP entity.

In the embodiment of the present disclosure, the second receiving unit is configured to receive the data packet or the control message transmitted from the RAN-UP entity through a second interface. The control message is a data arrival indication or a paging indication.

In the embodiment of the present disclosure, the RAN-CP entity further includes: a second processing unit, which is configured to extract service identification information from an interface message corresponding to the second interface when receiving the data packet transmitted from the RAN-UP entity through the second interface.

The second processing unit is further configured to encapsulate the data packet in the paging message and transmit the paging message to the UE; or integrate the service identification information in an encoding form into the data packet and transmit the data packet to the UE; or encapsulate the data packet and a data stream of the service identification information which are encoded by the RAN-UP entity in the paging message and transmit the paging message to the UE.

The service identification information is at least one of: a logical channel identifier of a service where the data packet is located and a bearer identifier to which the service belong.

A user equipment (UE) provided by an embodiment of the present disclosure is in an inactive state, the UE includes:

a third receiving unit, which is configured to receive a paging message transmitted from a residential access network control plane (RAN-CP) entity;

a first extracting unit, which is configured to extract a first indication message from the paging message; and a third processing unit, which is configured to maintain in the inactive state and extract a data packet from the paging message in the inactive state according to the first indication message.

A user equipment (UE) provided by an embodiment of the present disclosure is in an inactive state, the UE includes:

a fourth receiving unit, which is configured to receive a paging message transmitted from a residential access network control plane (RAN-CP) entity;

a second extracting unit, which is configured to extract a second indication message from the paging message; and a fourth processing unit, which is configured to emigrate from the inactive state and enter into an active state, and receive a data packet transmitted from a residential access network user plane (RAN-UP) entity in the active state according to the second indication message.

A computer-readable storage medium further provided by an embodiment of the present disclosure is configured to store computer-executable instructions for executing the above-mentioned methods when executed by a processor.

In technical solutions of the embodiments of the present disclosure, in one implementation mode, the RAN-UP entity receives a data packet transmitted from a core network. The RAN-UP entity transmits the data packet to a residential access network control plane (RAN-CP) entity. The RAN-CP entity receives a data packet transmitted from a residential access network user plane (RAN-UP) entity, and encapsulates the data packet in a paging message and transmits the paging message to UE. The paging message carries a first indication message, the first indication message is configured for indicating the UE to maintain an inactive state when receiving the paging message, and extract the data packet from the paging message. In another implementation modem, the RAN-UP entity receives a data packet transmitted from a core network. The RAN-UP entity transmits a data packet arrival indication or a paging indication to a residential access network control plane (RAN-CP) entity. The RAN-CP entity receives the data packet arrival indication or the paging indication transmitted by the RAN-UP entity. The RAN-CP entity encapsulates the paging message and transmits the paging message to UE. The paging message carries a second indication message, the second indication message is configured for indicating the UE to emigrate from the inactive state and enter into a active state when receiving the paging message, and receive the data packet transmitted by the RAN-CP entity. In this case, the architecture in which the 5G RAN control plane is separated from the user plane implements a paging and data transmission in the inactive state.

Other aspects can be understood after the drawings and detailed description are read and understood.

BRIEF DESCRIPTION OF DRAWINGS

In the drawings (which are not necessarily drawn to scale), similar reference numbers may denote similar components in different views. The similar reference numbers with different letter suffixes may denote different examples of the similar components. The drawings generally illustrate various embodiments discussed in the present disclosure by way of examples not limitations.

DETAILED DESCRIPTION

To provide a more detailed understanding of features and technical contents of embodiments of the present disclosure, implementation of the embodiments of the present disclosure is described below in detail with reference to the drawings. The drawings are provided for reference only and are not intended to limit the embodiments of the present disclosure.

Figure 1:
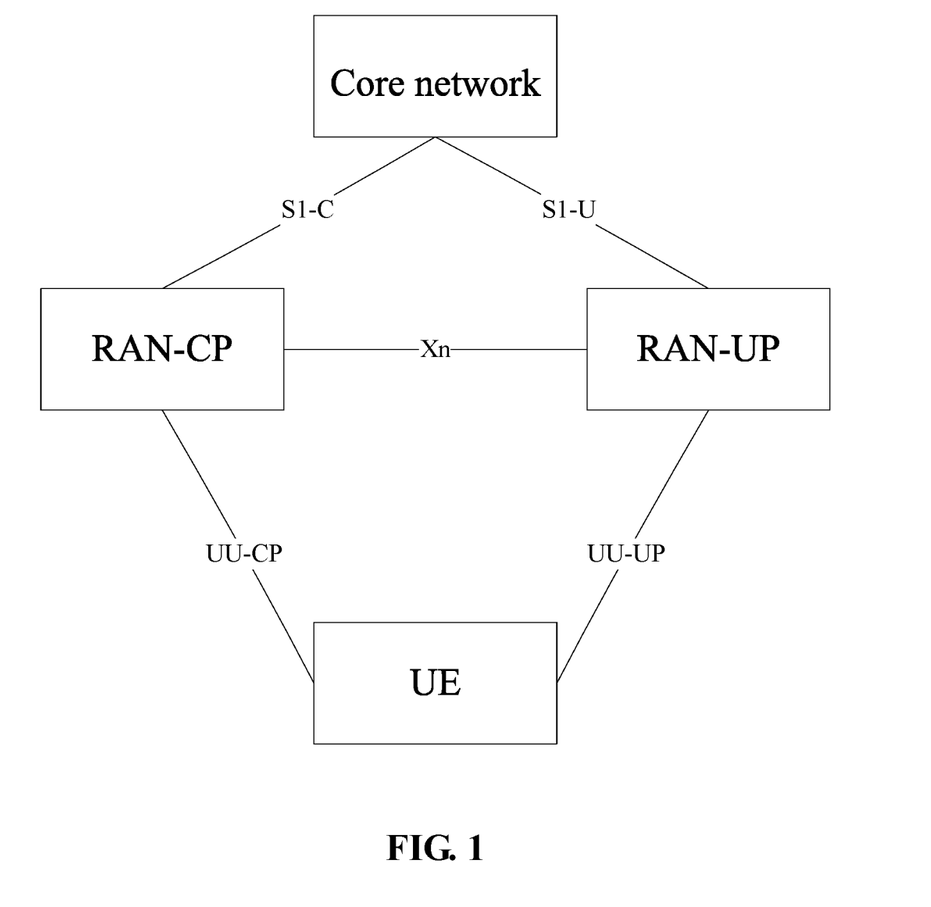
FIG. 1 is a schematic diagram showing an architecture of a RAN-CP entity and a RAN-UP entity according to an embodiment of the present disclosure.

FIG. 1 is a schematic diagram showing an architecture of a RAN-CP entity and a RAN-UP entity according to an embodiment of the present disclosure. As shown in FIG. 1, after a RAN-CP entity and a RAN-UP entity of 5G are separated from each other, when UE is in a inactive state, a downlink data packet of a core network arrives at the RAN-UP entity through S1-U interface. The RAN-UP entity optionally executes two processes after receiving the data packet.

Process one: the RAN-UP entity transmits the data packet to the RAN-CP entity through an Xn interface message. In one implementation mode, the Xn interface message may carry, but is not limited to a logical channel identifier of a service where the data packet is located or a bearer identifier to which the service belongs.

The RAN-CP entity receives the message transmitted from the RAN-UP entity through the Xn interface, and extracts the data packet in the message. In one implementation mode, the logical channel identifier of the service where the data packet is located or the bearer identifier to which the service belongs in the message may be extracted. Then the data packet is (in one implementation mode, the logical channel identifier of the service where the data packet is located or the bearer identifier to which the service belongs is also) encapsulated in a paging message and transmitted to the UE, the paging message indicates the UE not to emigrate from the inactive sate.

The UE receives the data packet in the paging message, but the UE does not need to emigrate from the inactive sate.

Process two: the RAN-UP entity informs the RAN-CP entity that the data packet is arrived through the Xn interface message. The Xn interface message indicates that the data packet is arrived.

After receiving the message transmitted from the RAN-UP entity through the Xn interface, the RAN-CP entity encapsulates the paging message and transmits the paging message to the UE. The paging message indicates the UE to emigrate from the inactive state.

The UE receives the paging message and initiates a process of emigrating from the inactive state and entering into an active state, and receives the downlink data packet transmitted by the RAN-UP entity in the active state.

In a mode in which the RAN-CP entity is separated from the RAN-UP entity, the technical solutions of the embodiments of the present disclosure supports a data reception of the UE in the inactive state and a data transmission after waking up and emigrating from the inactive state according to service attributes.

Figure 2:
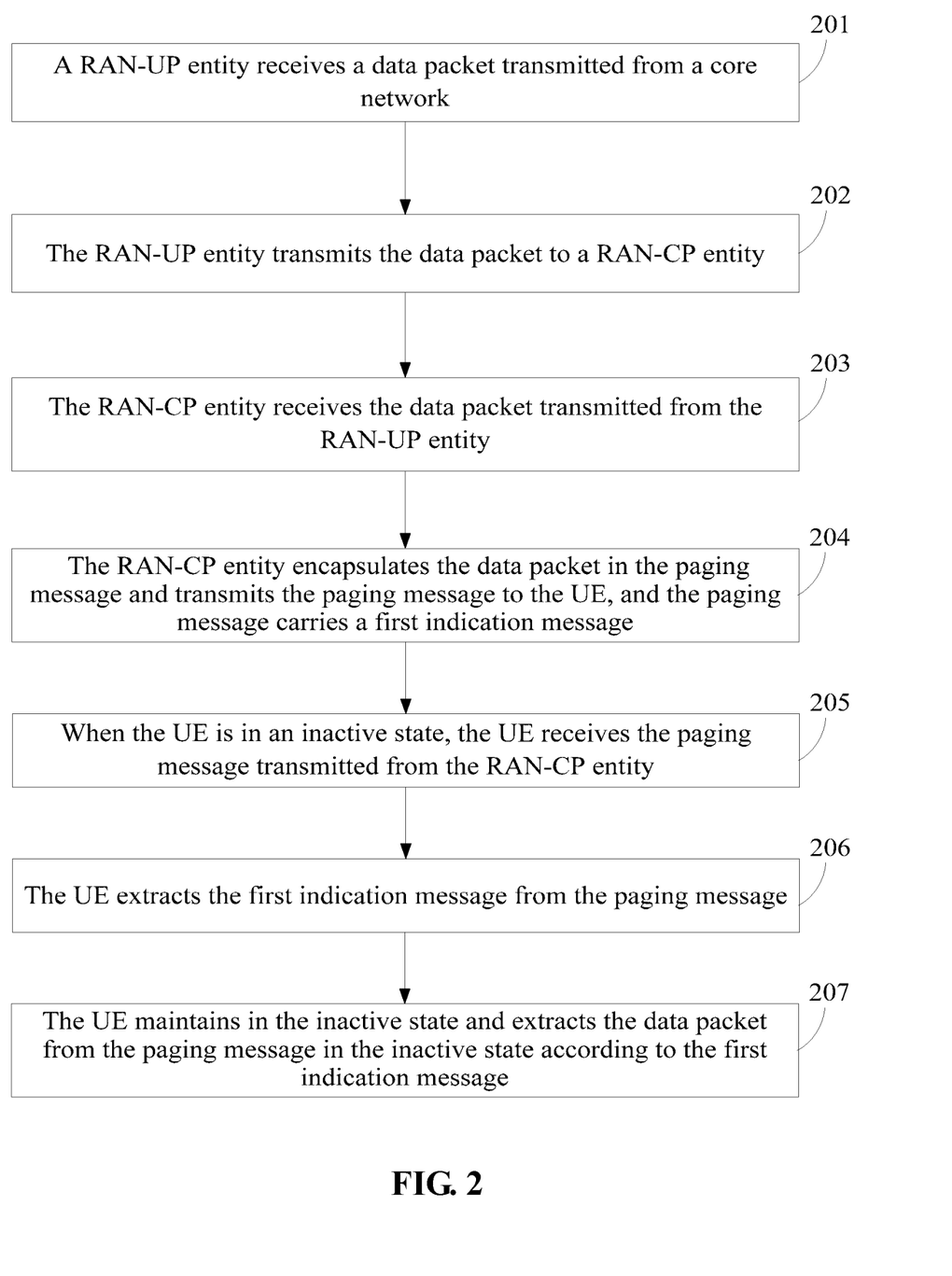
FIG. 2 is a flowchart of a paging method according to embodiment one of the present disclosure.

FIG. 2 is a flowchart of a paging method according to embodiment one of the present disclosure. As shown in FIG. 2, the method includes the steps described below.

In step 201, a residential access network user plane (RAN-UP) entity receives a data packet transmitted from a core network.

Here, the RAN-UP entity receives the data packet transmitted from the core network through the S1-U interface.

In step 202, the RAN-UP entity transmits the data packet to a residential access network control plane (RAN-CP) entity.

Here, the RAN-UP entity transmits the data packet to the RAN-CP entity through an Xn interface.

In one implementation mode, service identification information is carried in an interface message corresponding to the Xn interface when the RAN-UP entity transmits the data packet to the RAN-CP entity through the Xn interface, or the RAN-UP entity packs and encodes the data packet and the service identification information into a data steam and transmits the data stream to the RAN-CP entity.

The service identification information is at least one of: a logical channel identifier of a service where the data packet is located and a bearer identifier to which the service belongs.

In step 203, the RAN-CP entity receives the data packet transmitted from the RAN-UP entity.

Here, the RAN-CP entity receives the data packet transmitted from the RAN-UP entity through the Xn interface.

In step 204, the RAN-CP entity encapsulates the data packet in the paging message and transmits the paging message to the UE. A first indication message is carried in the paging message.

The first indication message is configured for indicating the UE to maintain an inactive state when receiving the paging message, and extract the data packet from the paging message.

In the embodiment of the present disclosure, the RAN-CP entity extracts service identification information from an interface message corresponding to a second interface when receiving the data packet transmitted from the RAN-UP entity through the second interface; and encapsulates the service identification information in the paging message and transmits the paging message to the UE, or the service identification information is integrated in an encoding form into the data packet, and the data packet is encapsulated in the paging message and transmitted to the UE, or the data packet and a data stream of the service identification information which are encoded and transmitted from the RAN-UP entity are encapsulated in the paging message and transmitted to the UE.

In step 205, when the UE is in the inactive state, the UE receives the paging message transmitted from the RAN-CP entity.

In step 206, the UE extracts the first indication message from the paging message.

In step 207, the UE maintains in the inactive state and extracts the data packet from the paging message in the inactive state according to the first indication message.

Figure 3:
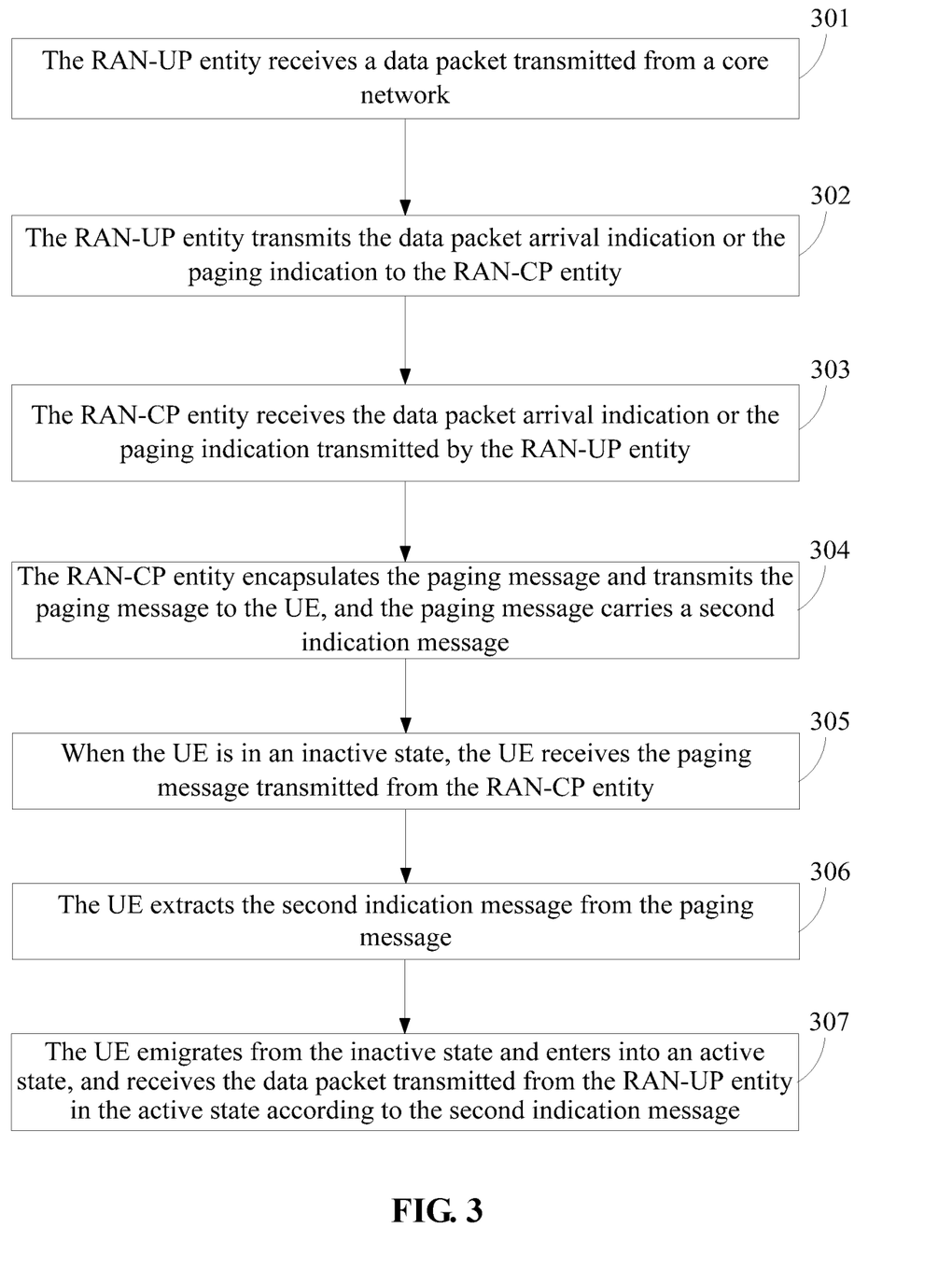
FIG. 3 is a flowchart of a paging method according to embodiment two of the present disclosure.

FIG. 3 is a flowchart of a paging method according to embodiment two of the present disclosure. As shown in FIG. 3, the method includes the steps described below.

In step 301, the RAN-UP entity receives a data packet transmitted from a core network.

Here, the RAN-UP entity transmits a data packet arrival indication or a paging indication to the RAN-CP entity.

In step 302, the RAN-UP entity transmits the data packet arrival indication or the paging indication to the RAN-CP entity.

Here, the RAN-UP entity transmits the data packet arrival indication or the paging indication to the RAN-CP entity through an Xn interface.

In step 303, the RAN-CP entity receives the data packet arrival indication or the paging indication transmitted from the RAN-UP entity.

Here, the RAN-CP entity receives the data packet arrival indication or the paging indication transmitted from the RAN-UP entity through the Xn interface.

In step 304, the RAN-CP entity encapsulates the paging message and transmits the paging message to the UE. A second indication message is carried in the paging message.

Here, the second indication message is configured for indicating the UE to emigrate from the inactive state and enter into an active state when receiving the paging message, and receive the data packet transmitted from the RAN-CP entity.

In step 305, when the UE is in the inactive state, the UE receives the paging message transmitted from the RAN-CP entity.

In the step 306, the UE extracts the second indication message from the paging message.

In the step 307, the UE emigrates from the inactive state and enters into the active state, and receives the data packet transmitted from the RAN-UP entity in the active state according to the second indication message.

The paging method provided by the embodiments of the present disclosure will be further discussed in detail in conjunction with application scenarios.

Application Scenario One

Figure 4:
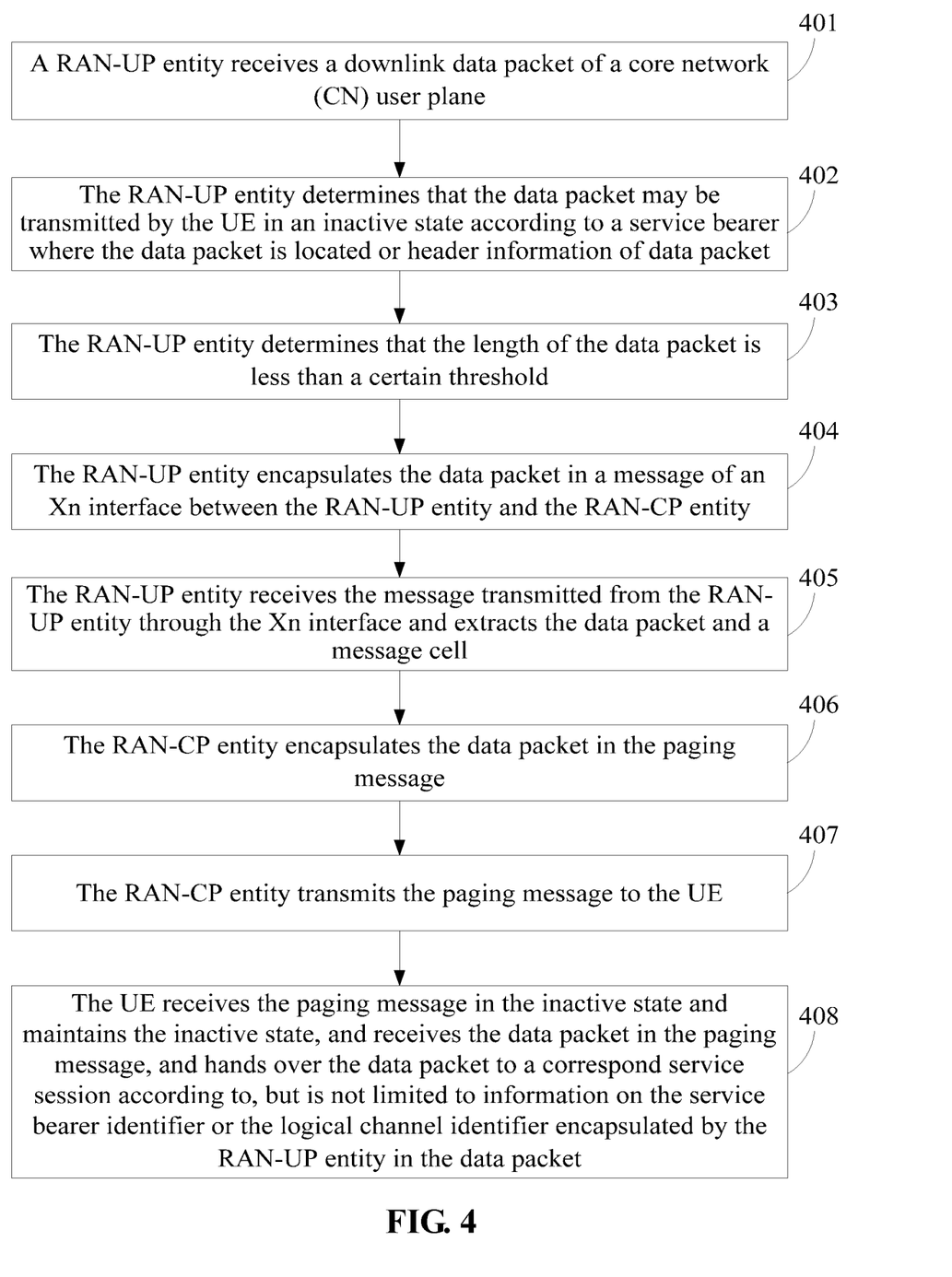
FIG. 4 is a flowchart of application scenario one according to an embodiment of the present disclosure.

According to service and size of a data packet, the data packet is carried to UE through a paging message, the UE receives the data packet in an inactive state, referring to FIG. 4.

In step 401, a RAN-UP entity receives a downlink data packet of a core network (CN) user plane.

In step 402, the RAN-UP entity determines that the data packet may be transmitted when the UE is in the inactive state according to a service bearer where the data packet is located or header information of the data packet.

The header information of the data packet includes, but is not limited to a Quality of Service (QoS) level.

In step 403, the RAN-UP entity determines that the length of the data packet is less than a certain threshold In step 404, the RAN-UP entity encapsulates the data packet in a message of an Xn interface between the RAN-UP entity and the RAN-CP entity. The message may be added with, but is not limited to an identifier of the service bearer where the data packet is located or the logical channel identifier. Then the RAN-UP entity transmits the message to the RAN-CP entity.

In step 405, the RAN-UP entity receives the message transmitted from the RAN-UP entity through the Xn interface, and extracts the data packet and a message cell from the message.

In step 406, the RAN-CP entity encapsulates the data packet in the paging message. Here, the paging message may be added with, but is not limited to the identifier of the service bearer where the data packet is located or the logical channel identifier.

The paging message indicates the UE not to emigrate from the inactive state and receive the data packet in the paging.

In step 407, the RAN-CP entity transmits the paging message to the UE.

In step 408, the UE receives the paging message in the inactive state and maintains the inactive state, and receives the data packet in the paging message, and hands over the data packet to a correspond service session according to, but is not limited to information on the service bearer identifier or the logical channel identifier encapsulated by the RAN-UP entity in the data packet.

Application Scenario Two

Figure 5:
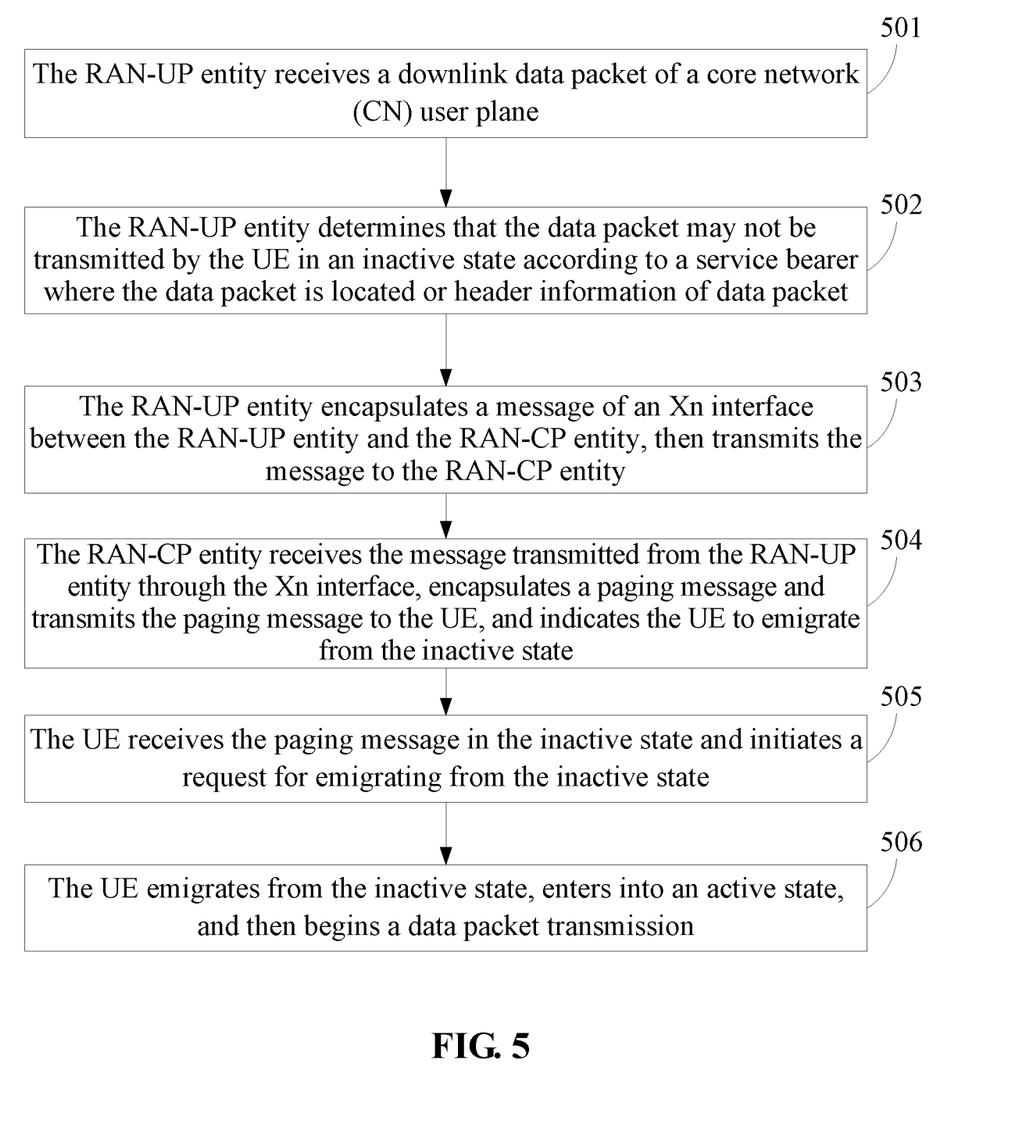
FIG. 5 is a flowchart of application scenario two according to an embodiment of the present disclosure.

According to service characteristics of a data packet, UE is emigrated from an inactive state through a paging message, and then receives the data packet. Referring to FIG. 5, In step 501: the RAN-UP entity receives a downlink data packet of a core network (CN) user plane.

In step 502, the RAN-UP entity determines that the data packet may not be transmitted when the UE is in the inactive state according to a service bearer where the data packet is located or header information of the data packet.

Here, the header information of the data packet includes, but is not limited to a Quality of Service (QoS) level.

In step 503, the RAN-UP entity encapsulates a message of an Xn interface between the RAN-UP entity and the RAN-CP entity. The message includes, but is not limited to indicate the RAN-CP entity that a receivable data packet is arrived. Then the message is transmitted to the RAN-CP entity.

In the step 504, the RAN-CP entity receives the message transmitted from the RAN-UP entity through the Xn interface, encapsulates a paging message and transmits the paging message to the UE, and indicates the UE to emigrate from the inactive state.

In step 505, the UE receives the paging message in the inactive state and initiates a request for emigrating from the inactive state.

In the step 506, the UE emigrates from the inactive state, enters into an active state, and then begins a data packet transmission.

Application Scenario Three

Figure 6:
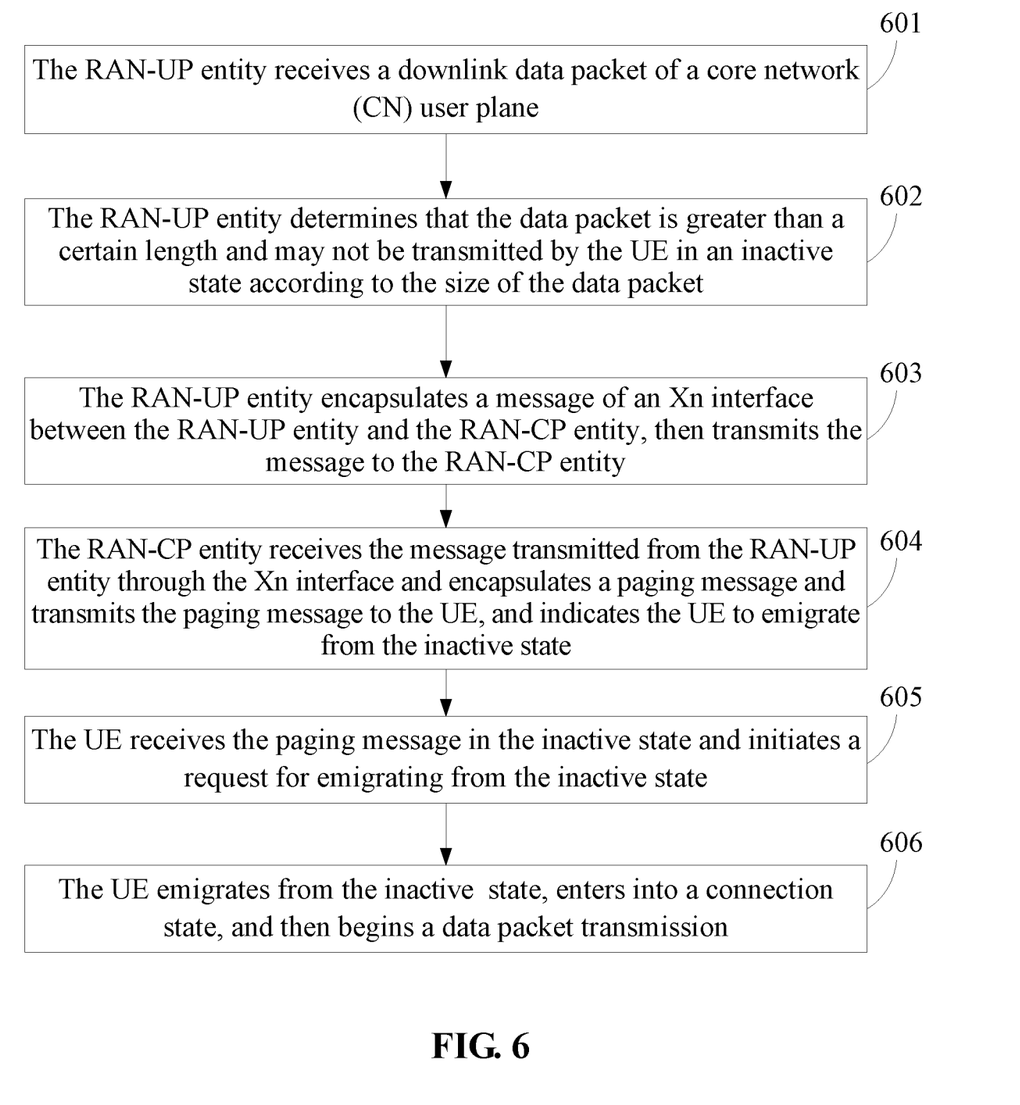
FIG. 6 is a flowchart of application scenario three according to an embodiment of the present disclosure.

According to size characteristics of a data packet, UE is emigrated from an inactive state through a paging message. The UE receives the data packet in an active state. Referring to FIG. 6, In step 601: the RAN-UP entity receives a downlink data packet of a core network (CN) user plane.

In step 602, the RAN-UP entity determines that the packet length of the data packet is greater than a certain length and may not be transmitted by the UE in the inactive state according to the size of the data packet.

In step 603, the RAN-UP entity encapsulates a message of an Xn interface between the RAN-UP entity and the RAN-CP entity, where the message includes, but is not limited to indicate the RAN-CP entity that a receivable data packet is arrived, then transmits the message to the RAN-CP entity.

In the step 604, the RAN-CP entity receives the message transmitted from the RAN-UP entity through the Xn interface and encapsulates a paging message and transmits the paging message to the UE, and indicates the UE to emigrate from the inactive state.

In step 605, the UE receives the paging message in the inactive state and initiates a request for emigrating from the inactive state.

In the step 606, the UE emigrates from the inactive state, enters into an active state, and then begins a data packet transmission.

Figure 7:
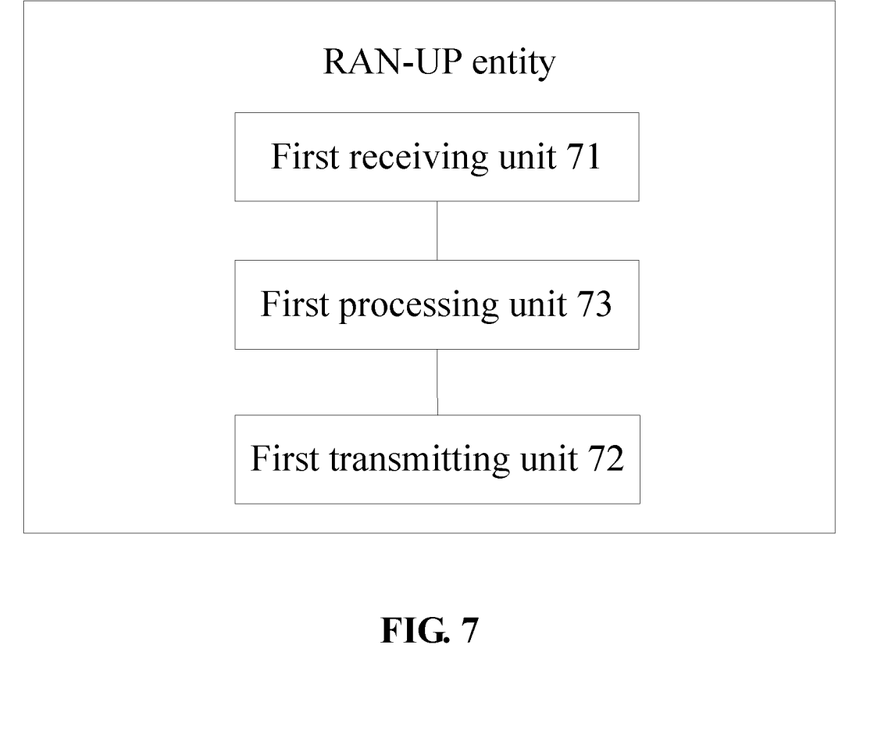
FIG. 7 is a structural diagram of a RAN-UP entity according to an embodiment of the present disclosure.

FIG. 7 is a structural diagram of a RAN-UP entity according to an embodiment of the present disclosure. The RAN-UP entity includes: a first receiving unit 71, which is configured to receive a data packet transmitted from a core network; and a first transmitting unit 72, which is configured to transmit the data packet or a control message to a RAN-CP entity.

The first receiving unit 71 is configured to receive the data packet transmitted from the core network through a first interface.

The first transmitting unit 72 is configured to transmit the data packet or the control message to the RAN-CP entity through a second interface. The control message is a data arrival indication or a paging indication.

The RAN-UP entity further includes: a first processing unit 73, which is configured to carry service identification information in an interface message corresponding to the second interface when transmitting the data packet to the RAN-CP entity through the second interface; or encode the service identification information into a data stream and transmit the data stream to the RAN-CP entity. The service identification information is at least one of: a logical channel identifier of a service where the data packet is located and a bearer identifier to which the service belongs.

It is to be understood by those skilled in the art that implementation of functions of various entities of the RAN-UP entity of FIG. 7 may be understood with reference to the description of the foregoing paging method. The functions of the various entities of the RAN-UP entity of FIG. 7 may be implemented by programs running on a processor or by logic circuits.

Figure 8:
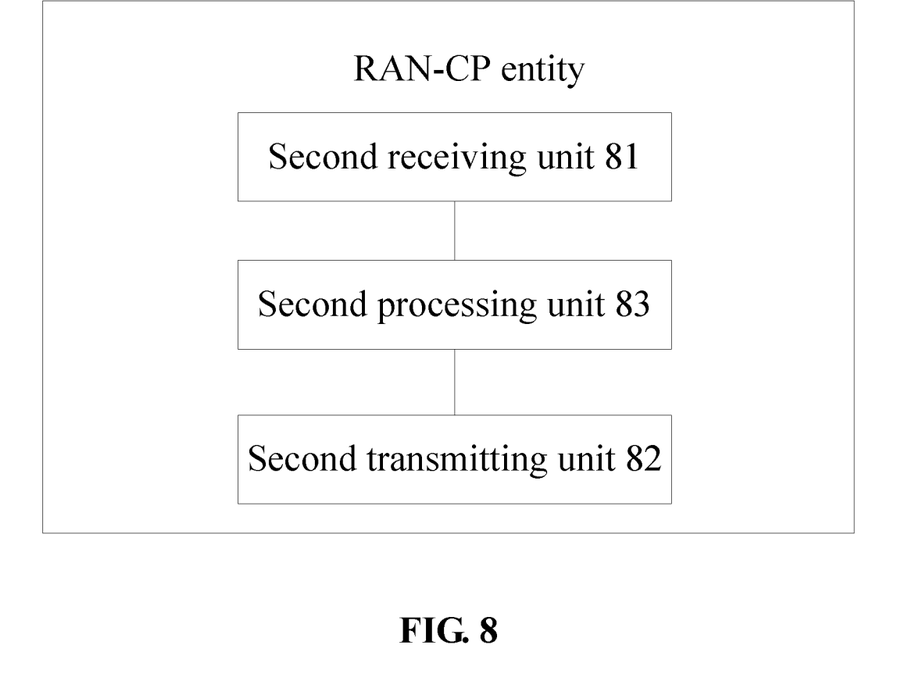
FIG. 8 is a structural diagram of a RAN-CP entity according to an embodiment of the present disclosure.

FIG. 8 is a structural diagram of a RAN-CP entity according to an embodiment of the present disclosure. The RAN-CP entity includes:

a second receiving unit 81, which is configured to receive a data packet or a control message transmitted from a RAN-UP entity; and a second transmitting unit 82, which is configured to encapsulate the data packet in a paging message and transmit the paging message to the UE; where a first indication message is carried in the paging message, the first indication message is configured for indicating the UE to maintain in an inactive state when receiving the paging message, and extract the data packet from the paging message; or is configured to encapsulate the paging message and transmit the paging message to the UE; where a second indication message is carried in the paging message, the second indication message is configured for indicating the UE to emigrate from the inactive state and enter into an active state when receiving the paging message, and receive the data packet transmitted from the RAN-CP entity.

The second receiving unit 81 is configured to receive the data packet or the control message transmitted from the RAN-UP entity through a second interface. The control message is a data arrival indication or a paging indication.

The RAN-CP entity further includes: a second processing unit 83, which is configured to extract service identification information from an interface message corresponding to the second interface when receiving the data packet transmitted from the RAN-UP entity through the second interface.

The second processing unit 83 is further configured to encapsulate the data packet in the paging message and transmit the paging message to the UE; or integrate the service identification information into the data packet in an encoding form and transmit the data packet to the UE; or encapsulate the data packet and a data stream of the service identification information which are encoded by the RAN-UP entity in the paging message and transmit the paging message to the UE.

The service identification information is at least one of: a logical channel identifier of a service where the data packet is located and a bearer identifier to which the service belongs.

It is to be understood by those skilled in the art that implementation of functions of various entities of the RAN-CP entity of FIG. 8 may be understood with reference to the description of the foregoing paging method. The functions of the various entities of the RAN-CP entity of FIG. 8 may be implemented by programs running on a processor or by logic circuits.

Figure 9:
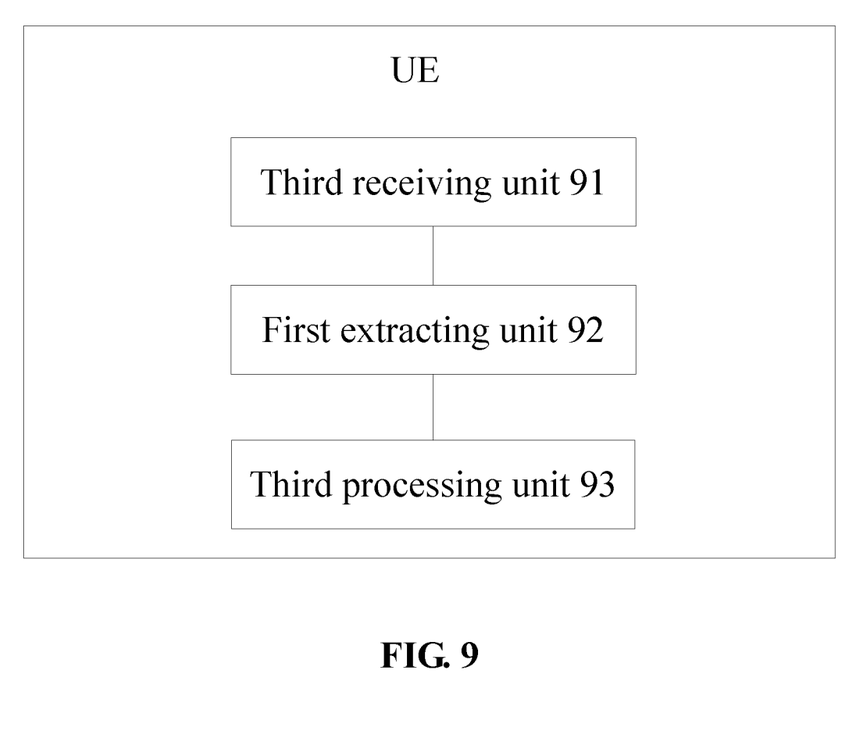
FIG. 9 is a structural diagram of a user equipment (UE) according to an embodiment of the present disclosure.

FIG. 9 is a structural diagram of a user equipment according to an embodiment of the present disclosure.

In the embodiment of the present disclosure, the terminal further includes:

a third receiving unit 91, which is configured to receive a paging message transmitted from a residential access network control plane (RAN-CP) entity;

a first extracting unit 92, which is configured to extract a first indication message from the paging message; and a third processing unit 93, which is configured to maintain in the inactive state and extract a data packet from the paging message in the inactive state according to the first indication message.

Figure 10:
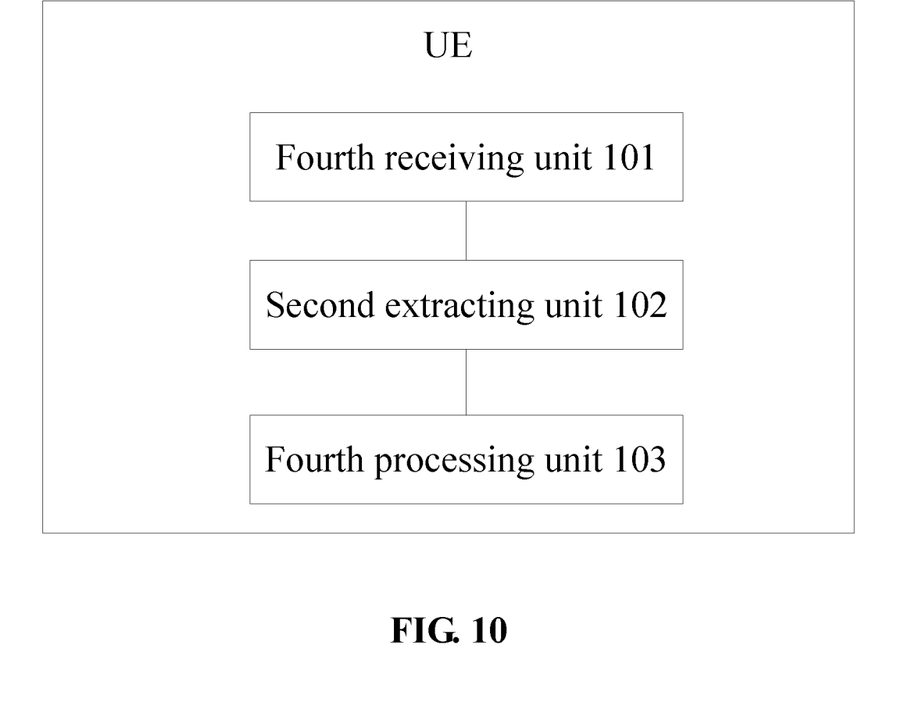
FIG. 10 is a structural diagram of a user equipment (UE) according to another embodiment of the present disclosure.

As shown in FIG. 10, in another embodiment of the present disclosure, the terminal includes:

a fourth receiving unit 101, which is configured to receive a paging message transmitted from a residential access network control plane (RAN-CP) entity;

a second extracting unit 102, which is configured to extract a second indication message from the paging message; and a fourth processing unit 103, which is configured to emigrate from the inactive state and enter into an active state, and receive a data packet transmitted from a residential access network user plane (RAN-UP) entity in the active state according to the second indication message.

It is to be understood by those skilled in the art that implementation of functions of various units of the UE entity of FIGS. 9 and 10 may be understood with reference to the description of the foregoing paging method. The UE shown in FIGS. 9 and 10 may be one UE. The functions of the various units of the UE therein may be implemented by programs running on a processor or by logic circuits.

A computer-readable storage medium further provided by an embodiment of the present disclosure is configured to store computer-executable instructions for executing the above-mentioned methods when executed by a processor.

It is to be understood by those skilled in the art that the embodiments of the present disclosure may be provided as methods, systems and computer program products.

Therefore, the present disclosure may adopt the mode of a hardware embodiment, a software embodiment, or a combination of hardware and software embodiment. In addition, the present disclosure may take the form of a computer program product implemented on one or more computer-usable storage media (which includes, but is not limited to, a disk memory and an optical memory) which includes computer-usable program codes.

The present disclosure is described with reference to flowcharts and/or block diagrams of methods, apparatus (systems) and computer program products according to the embodiments of the present disclosure. It should be understood that each flow and/or block in the flowcharts and/or block diagrams and a combination of flows and/or blocks in the flowcharts and/or block diagrams are implemented by computer program instructions. These computer program instructions can be provided to a general-purpose computer, a special-purpose computer, an embedded processor or a processor of other programmable data processing apparatus to produce a machine so that instructions executed by a computer or a processor of another programmable data processing apparatus produce a means for implementing the functions specified in one or more flows in the flowcharts and/or one or more blocks in the block diagrams.

These computer program instructions can also be stored in a computer-readable memory which can direct a computer or other programmable data processing apparatus to operate in a particular manner so that the instructions stored in the computer-readable memory produce a manufactured product including an instruction device. The instruction device implements the functions specified in one or more flows in the flowcharts and/or one or more blocks in the block diagrams.

These computer program instructions can also be loaded onto a computer or other programmable data processing apparatus so that a series of operation steps are performed on the computer or another programmable apparatus to produce processing implemented by a computer. Therefore, instructions executed on a computer or another programmable apparatus provide steps for implementing the functions specified in one or more flows in the flowcharts and/or one or more blocks in the block diagrams.

The above are merely embodiments of the present disclosure and are not intended to limit the protection scope of the present disclosure.

INDUSTRIAL APPLICABILITY

Through embodiments of the present disclosure, the architecture in which the 5G RAN control plane is separated from the user plane implements a paging and data transmission in an inactive state.

What is claimed is:

1. A communication method comprising:
   receiving, by a residential access network user plane (RAN-UP) entity, a data packet transmitted from a core network;
   performing a determination, by the RAN-UP entity, that the data packet is not to be transmitted to a user equipment (UE) in an inactive state upon determining that a packet length of the data packet is greater than a certain length; and
   transmitting, by the RAN-UP entity, a message to a residential access network control plane (RAN-CP) entity to indicate to the RAN-CP entity to send a paging message to the UE, wherein the message is transmitted based on the performing the determination.

2. The method according to claim 1, wherein the data packet is received through a first interface.

3. The method according to claim 1, wherein the message is transmitted through a second interface;
   wherein the message indicates that the data packet is arrived.

4. The method according to claim 1, further comprising:
   transmitting, by the RAN-UP entity, an interface message that includes a service identification information, wherein the service identification information includes a logical channel identifier of a service associated with the data packet and a bearer identifier to which the service belongs.

5. A paging method, comprising:
   receiving, by a residential access network control plane (RAN-CP) entity, a message transmitted from a residential access network user plane (RAN-UP) entity, wherein the message is received in response to a packet length of a data packet to be transmitted to a user equipment (UE) being greater than a certain length; and transmitting, after receiving the message, a paging message to the UE, wherein an indication message is carried in the paging message, the indication message is configured to indicate to the UE to emigrate from an inactive state and enter into an active state.

6. The paging method according to claim 5, wherein the message is received by the RAN-CP entity through an interface, wherein the message includes a data arrival indication for a data packet arrived at the RAN-UP entity.

7. The method according to claim 5, further comprising:

receiving, by the RAN-CP entity, an interface message that includes a service identification information, wherein the service identification information includes a logical channel identifier of a service associated with the data packet and a bearer identifier to which the service belongs; and encapsulating, by the RAN-CP entity, the service identification information in the paging message, wherein the transmitting the paging message to the UE includes transmitting the service identification information to the UE.

8. A non-transitory computer-readable storage medium having executable instructions stored thereon that, when executed by a processor, direct the processor to perform a method comprising:

receiving, by a residential access network user plane (RAN-UP) entity, a data packet transmitted from a core network;

performing a determination, by the RAN-UP entity, that the data packet is not to be transmitted to a user equipment (UE) in an inactive state upon determining that a packet length of the data packet is greater than a certain length; and transmitting, by the RAN-UP entity, a message to a residential access network control plane (RAN-CP) entity to indicate to the RAN-CP entity to send a paging message to the UE, wherein the message is transmitted based on the performing the determination.

9. The non-transitory computer-readable storage medium according to claim 8, wherein the data packet is received through a first interface.

10. The non-transitory computer-readable storage medium according to claim 8, wherein the message is transmitted through a second interface; wherein the message indicates that the data packet is arrived.

11. The non-transitory computer-readable storage medium according to claim 8, wherein the method further comprises:

transmitting, by the RAN-UP entity, an interface message that includes a service identification information, wherein the service identification information includes a logical channel identifier of a service associated with the data packet and a bearer identifier to which the service belongs.

12. A non-transitory computer-readable storage medium having executable instructions stored thereon that, when executed by a processor, direct the processor to perform a method comprising:

receiving, by a residential access network control plane (RAN-CP) entity, a message transmitted from a residential access network user plane (RAN-UP) entity, wherein the message is received in response to a packet length of a data packet to be transmitted to a user equipment (UE) being greater than a certain length; and transmitting, after receiving the message, a paging message to the UE, wherein an indication message is carried in the paging message, the indication message is configured to indicate to the UE to emigrate from an inactive state and enter into an active state.

13. The non-transitory computer-readable storage medium according to claim 12, wherein the message is received by the RAN-CP entity through an interface, wherein the message includes a data arrival indication for a data packet arrived at the RAN-UP entity.

14. The non-transitory computer-readable storage medium according to claim 12, wherein the method further comprises:

receiving, by the RAN-CP entity, an interface message that includes a service identification information, wherein the service identification information includes a logical channel identifier of a service associated with the data packet and a bearer identifier to which the service belongs; and encapsulating, by the RAN-CP entity, the service identification information in the paging message, wherein the transmitting the paging message to the UE includes transmitting the service identification information to the UE.

* * * * *

UNITED STATES PATENT AND TRADEMARK OFFICE
CERTIFICATE OF CORRECTION

PATENT NO. : 10,966,176 B2  
APPLICATION NO. : 16/232972  
DATED : March 30, 2021  
INVENTOR(S) : Qiang Huang Page 1 of 1

It is certified that error appears in the above-identified patent and that said Letters Patent is hereby corrected as shown below:

On the Title Page

In Item (71), under "Applicant", in Column 1, Lines 1-2, delete "Guanghong (CN)" and insert -- Guangdong (CN) --, therefor.

On Page 2, in Item (56), under "OTHER PUBLICATIONS", in Column 2, Line 8, delete "Bengalore," and insert -- Bangalore, --, therefor.

In the Specification

In Column 4, Line 49, delete "belong." and insert -- belongs. --, therefor.

In Column 5, Line 33, delete "a active" and insert -- an active --, therefor.

In Column 6, Line 20, delete "a inactive" and insert -- an inactive --, therefor.

In Column 6, Line 43, delete "sate." and insert -- state. --, therefor.

In Column 6, Line 45, delete "sate." and insert -- state. --, therefor.

In Column 8, Line 44, delete "threshold" and insert -- threshold. --, therefor.

In Column 9, Line 2, delete "correspond" and insert -- corresponding --, therefor.

In the Claims

In Column 13, Line 14, in Claim 7, delete "method" and insert -- paging method --, therefor.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*